US011303532B2

(12) United States Patent
Wang

(10) Patent No.: US 11,303,532 B2
(45) Date of Patent: Apr. 12, 2022

(54) METHOD AND SYSTEM FOR DETECTING SERVICE QUALITY OF CDN SYSTEM

(71) Applicant: Wangsu Science & Technology Co., Ltd., Shanghai (CN)

(72) Inventor: Wenting Wang, Shanghai (CN)

(73) Assignee: Wangsu Science & Technology Co., Ltd., Shanghai (CN)

( * ) Notice: Subject to any disclaimer, the term of this patent is extended or adjusted under 35 U.S.C. 154(b) by 63 days.

(21) Appl. No.: 16/882,347

(22) Filed: May 22, 2020

(65) Prior Publication Data

US 2020/0382382 A1    Dec. 3, 2020

Related U.S. Application Data

(63) Continuation of application No. PCT/CN2019/096171, filed on Jul. 16, 2019.

(30) Foreign Application Priority Data

Jun. 3, 2019    (CN) .......................... 201910474788.2

(51) Int. Cl.
*H04L 41/142*    (2022.01)
*H04L 67/10*    (2022.01)

(52) U.S. Cl.
CPC ............ *H04L 41/142* (2013.01); *H04L 67/10* (2013.01)

(58) Field of Classification Search
CPC ............... H04L 41/142; H04L 41/5009; H04L 41/5019; H04L 65/4076; H04L 65/4084; H04L 65/80; H04L 67/10; H04L 21/64738
See application file for complete search history.

(56) References Cited

U.S. PATENT DOCUMENTS 11,057,351 B1 *   7/2021   Simanel ................ H04L 67/146
2012/0066360 A1   3/2012   Ghosh
(Continued)

FOREIGN PATENT DOCUMENTS

CN    1981278 A     6/2007
CN    101909335 A   12/2010
(Continued)

OTHER PUBLICATIONS

Wangsu Science & Technology Co., LTD., EP 19880946.9, Extended European Search Report, dated Nov. 12, 2020, 11 pgs.
(Continued)

*Primary Examiner* — June Y Sison
(74) *Attorney, Agent, or Firm* — USCH Law, PC

(57) ABSTRACT

The present application discloses a method and a system for detecting service quality of a CDN system. The method comprises: sending, by a detecting node, a copy instruction to an edge node; copying, by the edge node, received first request information to generate second request information after receiving the copy instruction; sending, by the edge node, the second request information to a CDN system to be detected; acquiring, by the detecting node, first response information corresponding to the first request information, and acquiring second response information corresponding to the second request information from the CDN system to be detected; and comparing, by the detecting node, the first response information with the second response information, to acquire service quality of the CDN system to be detected.

20 Claims, 3 Drawing Sheets

(56) References Cited

U.S. PATENT DOCUMENTS

| | | | |
|---|---|---|---|
| 2016/0028598 A1* | 1/2016 | Khakpour | H04L 43/50 709/224 |
| 2017/0126538 A1 | 5/2017 | Wistow | |
| 2017/0134253 A1* | 5/2017 | Wang | H04L 67/1097 |
| 2019/0190792 A1* | 6/2019 | Chen | H04L 41/147 |
| 2020/0244753 A1* | 7/2020 | Wang | H04N 21/2225 |
| 2020/0380050 A1* | 12/2020 | Wang | H04L 67/1095 |
| 2020/0382382 A1* | 12/2020 | Wang | H04L 65/4084 |
| 2021/0058363 A1* | 2/2021 | Shen | H04L 67/18 |
| 2021/0084382 A1* | 3/2021 | Kellicker | H04L 65/4076 |
| 2021/0119962 A1* | 4/2021 | Ramia | H04L 65/80 |
| 2021/0194951 A1* | 6/2021 | Dai | H04L 67/06 |

FOREIGN PATENT DOCUMENTS

| | | | |
|---|---|---|---|
| CN | 103746870 A | | 4/2014 |
| CN | 106375139 A | | 2/2017 |
| CN | 106911511 | * | 6/2017 |
| CN | 108234207 A | | 6/2018 |
| CN | 108696399 A | | 10/2018 |
| CN | 109067938 A | | 12/2018 |
| CN | 109194706 A | | 1/2019 |
| WO | WO 2017/084284 A1 | | 5/2017 |

OTHER PUBLICATIONS

Wangsu Science & Technology Co., International Search Report, PCT/CN2019/096171, dated Mar. 3, 2020, 4 pgs.

* cited by examiner

METHOD AND SYSTEM FOR DETECTING SERVICE QUALITY OF CDN SYSTEM

CROSS REFERENCE TO RELATED APPLICATIONS

The present application is a continuation of PCT Application No. PCT/CN2019/096171, filed on Jul. 16, 2019, which claims priority of Chinese Patent Application No. 201910474788.2, entitled "Method and System for Detecting Service Quality of CDN System," filed on Jun. 3, 2019, each of which is incorporated herein by reference in its entirety.

TECHNICAL FIELD

The present application relates to CDN technologies, and more particularly, to a method and a system for detecting service quality of a CDN system.

BACKGROUND

CDN, or content delivery network, is a layer of intelligent virtual network built on the Internet by placing node servers throughout the network. A CDN system can direct a user's request to a node server closest to the user in real time according to comprehensive information such as network traffic, connections and load statuses of respective nodes, as well as a distance to the user and response time. The purpose is to enable the user to obtain requested content nearby, prevent congestion of the Internet network, and improve a response speed of the user visiting a website.

With rapid development of the Internet, especially popularization of multimedia applications such as on-demand and live broadcast, more node servers are needed to improve network service quality, and converged CDN emerges as result. The converged CDN technology is a technology that provides network service by means of other CDN system, that is, a request received is switched to another CDN system, which can not only improve the response speed of the user visiting the website, but also greatly reduce costs of building its own node.

However, the existing converged CDN technology still has problems. Service quality of other CDN system to which the request is to be switched may not meet requirements. If the request is switched to such other CDN system, user experience can be affected. So it is necessary to detect the service quality of the other CDN system in advance. Traditional method of detecting service quality is by manually constructing traffic, which is time-consuming and laborious, with small traffic and monotonous data, and cannot guarantee precision of detection.

SUMMARY

In order to solve the problem of the existing technology, embodiments of the present application provide a method and a system for detecting service quality of a CDN system. The technical solutions are as follows.

In a first aspect, there is provided a method for detecting service quality of a CDN system, the method including:

sending, by a detecting node, a copy instruction to an edge node, thereby, copying, by the edge node, received first request information to generate second request information after receiving the copy instruction, and sending, by the edge node, the second request information to a CDN system to be detected;

comparing, by the detecting node, first response information of the first request information with second response information of the second request information to acquire service quality of the CDN system to be detected.

In some embodiments, the copy instruction includes a target domain name.

Accordingly, the step of copying, by the edge node, received first request information to generate second request information after receiving the copy instruction, includes:

receiving, by the edge node, the first request information after receiving the copy instruction, and if the first request information includes the target domain name, copying the first request information to generate the second request information.

In some embodiments, the copy instruction includes an indication of n-fold traffic magnification, where, n is a positive integer.

Accordingly, the step of copying, by the edge node, received first request information to generate second request information after receiving the copy instruction, includes:

receiving, by the edge node, the first request information after receiving the copy instruction, and copying the first request information n times to acquire n pieces of second request information.

In some embodiments, the copy instruction includes an indication of m-fold traffic minification, where, m is a positive integer;

Accordingly, the step of copying, by the edge node, received first request information to generate second request information after receiving the copy instruction, includes:

receiving, by the edge node, the first request information after receiving the copy instruction, and copying once every m pieces of the first request information to acquire one piece of second request information.

In some embodiments, after the step of copying, by the edge node, received first request information to generate second request information after receiving the copy instruction, the method includes:

marking, by the edge node, the second request information and the first request information corresponding to the second request information.

In some embodiments, the first response information and the second response information include a copy identifier.

In some embodiments, the step of comparing, by the detecting node, first response information of the first request information with second response information of the second request information to acquire service quality of the CDN system to be detected, includes:

acquiring the service quality of the CDN system to be detected by comparing response results and response time in the first response information and the second response information.

In a second aspect, there is provided a system for detecting service quality of a CDN system, the system including: a detecting node and an edge node.

The detecting node includes:

a sending module, configured to send a copy instruction to the edge node, to cause the edge node to copy received first request information to generate second request information after receiving the copy instruction, and to cause the edge node to send the second request information to a CDN system to be detected;

a comparing module, configured to compare first response information of the first request information with second response information of the second request information to acquire service quality of the CDN system to be detected.

In some embodiments, the copy instruction includes a target domain name.

Accordingly, the edge node is specifically configured to:

receive the first request information after receiving the copy instruction, and if the first request information includes the target domain name, copy the first request information to generate the second request information.

In some embodiments, the copy instruction includes an indication of n-fold traffic magnification, where, n is a positive integer;

Accordingly, the edge node is further configured to:

receive the first request information after receiving the copy instruction, and copy the first request information n times to acquire n pieces of second request information.

In some embodiments, the copy instruction includes an indication of m-fold traffic minification, where, m is a positive integer;

Accordingly, the edge node is further configured to:

receive the first request information after receiving the copy instruction, and copy once every m pieces of the first request information to acquire one piece of second request information.

In some embodiments, the edge node is further configured to mark the second request information and the first request information corresponding to the second request information.

In some embodiments, the first response information and the second response information include a copy identifier.

In some embodiments, the comparing module is specifically configured to:

acquire the service quality of the CDN system to be detected by comparing response results and response time in the first response information and the second response information.

In a third aspect, there is provided a node device, including:

at least one processor; and a memory communicating connected with the at least one processor; wherein, the memory is stored with instructions executable by the at least one processor, the instructions are executable by the at least one processor, to cause the at least one processor to execute the method for detecting the service quality of the CDN system according to the above-described first aspect.

In a fourth aspect, there is provided a computer readable storage medium, stored with a computer program, wherein, the computer program, when executed by the processor, implements the method for detecting the service quality of the CDN system according to the above-described first aspect.

Advantageous effects of the embodiments of the present application are as follows.

Firstly, the edge node copies request information sent by a client to acquire testing traffic for testing the other CDN system; since the edge node receives a large amount of request information in a real scene, a large amount of diverse testing traffic will be acquired by copying traffic, which can also improve construction efficiency of the testing traffic, and can improve precision of the test with real request information.

Secondly, the entire testing process of the embodiment of the present application, including comparative analysis of the response results, is implemented by automation, which, thus, reduces related management costs and labor costs, and improves efficiency and precision of the test.

Thirdly, in the detecting method according to the embodiment of the present application, the service quality of the other CDN system to which the request is to be switched can be detected in advance, so as to ensure the service quality after switch, and reduce a back-switch condition caused by a problem of service quality after switch.

BRIEF DESCRIPTION OF THE DRAWINGS

In order to clearly illustrate the technical solution of the embodiments the present application, the drawings to be used in description of the embodiments will be briefly described in the following; it is obvious that the described drawings are only related to some embodiments of the present application. Based on the drawings, those ordinarily skilled in the art can acquire other drawings, without any inventive work.

DETAILED DESCRIPTION

In order to make objects, technical details and advantages of the present application more apparent, hereinafter, embodiments of the present application will be further described in details in connection with the drawings.

Figure 1:
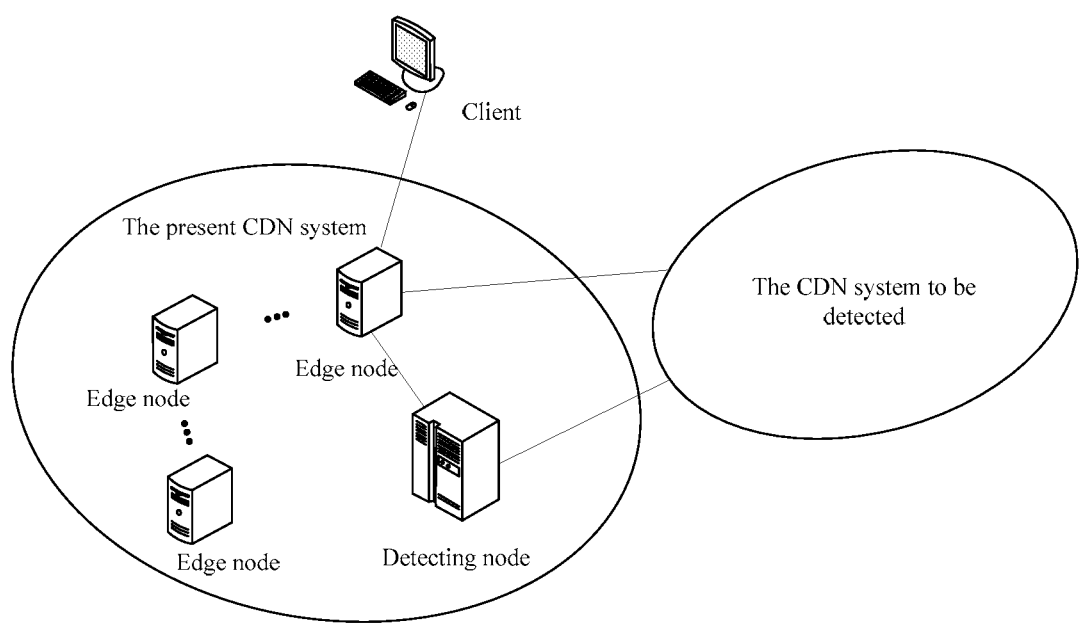
FIG. 1 is a schematic diagram of a network framework provided by an embodiment of the present application.

An embodiment of the present application provides a method for detecting service quality of a CDN system, and the method may be applied to a network framework shown in FIG. 1. The network framework includes a detecting node, an edge node and a CDN system to be detected. The detecting node and the edge node are located in the present CDN system, and the CDN system to be detected is a other CDN system. The detecting node is configured to send a copy instruction for copying traffic to the edge node. The edge node is usually configured to receive first request information sent by a client and to respond to the first request information. After receiving the copy instruction, the edge node further copies the received first request information to generate second request information, and sends the second request information to the CDN system that to be detected. The CDN system to be detected receives the second request information and responds to the second request information. The detecting node acquires first response information corresponding to the first request information, acquires second response information corresponding to the second request information from the CDN system to be detected, and compares the first response information and the second response information, so as to acquire service quality of the CDN system to be detected.

The detecting node includes a processor, a memory and a transceiver. The processor may be configured to execute processing of detecting the service quality of the CDN system in a process below. The memory may be configured to store data required and data generated in a processing procedure below. The transceiver may be configured to receive and send relevant data in the processing procedure below, such as to acquiring data that to be processed from other device and sending a data processing result to other device.

Figure 2:
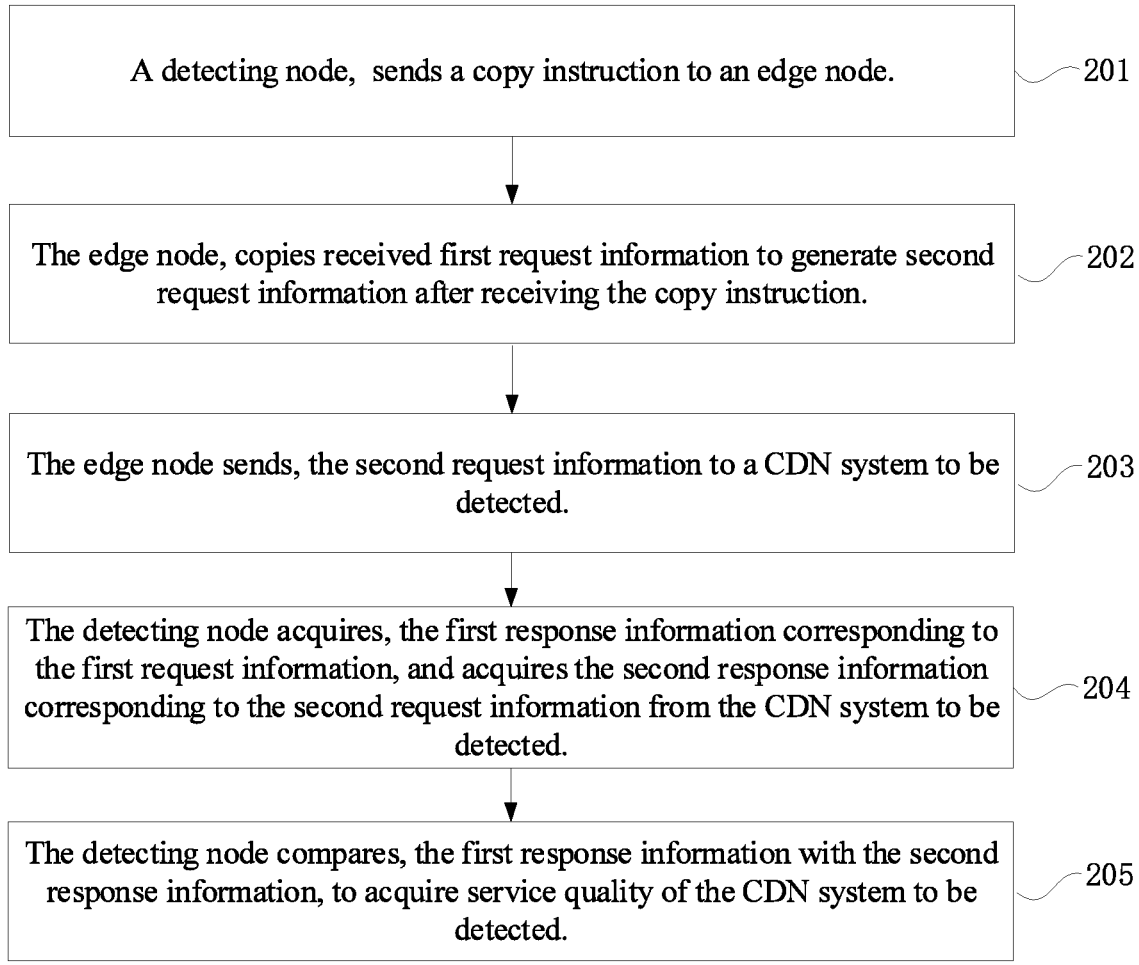
FIG. 2 is a flow chart of a method for detecting service quality of a CDN system provided by an embodiment of the present application.

Refer to FIG. 2, which is a flow chart of a method for detecting service quality of a CDN system provided by an embodiment of the present application, the method specifically includes steps below.

Step 201: a detecting node sends a copy instruction to an edge node.

In order to detect service quality of a other CDN system in a target region, the detecting node may randomly select an edge node of the present CDN system in the target region, and send the copy instruction to the edge node, so as to enable a traffic copying function of the edge node.

In order to detect service quality of the other CDN system with respect to a specific website, the copy instruction may include a target domain name corresponding to the website, so the edge node only copies request information of accessing the website, so that detection is more targeted and more precise.

Step 202: the edge node copies received first request information to generate second request information after receiving the copy instruction.

In practical application, the edge node continuously receives request information sent by a client and responds to the request information. After receiving the copy instruction sent by the detecting node, the edge node may copy the received request information by using a preset request copying tool, such as a TCPCopy tool. A real environment may be simulated more realistically by copying real traffic. Since the edge node receives a large amount of request information in a real scene, a large amount of diverse testing traffic will be acquired by copying traffic, which can also improve construction efficiency of the testing traffic, and can improve precision of the test with real request information.

After receiving the copy instruction, the edge node parses the copy instruction. If the copy instruction includes the target domain name, the edge node judges whether the received first request information includes the target domain name; if yes, the edge node copies the first request information; otherwise, the edge node does not copy.

In order to conveniently adjust an amount of the traffic for detection, the copy instruction may further include an indication of n-fold traffic magnification or an indication of m-fold traffic minification, so that the traffic may be magnified or minified according to specific detection requirements. For example, when the traffic for copying received by the edge node is relatively small, and is insufficient to precisely detect the service quality of the other CDN system, the traffic may be magnified; and when the traffic for copying received by the edge node is relatively large, the traffic may be appropriately minified in order to reduce traffic consumption and save costs, under the premise that precise detection of the service quality of the other CDN system can be guaranteed.

When the copy instruction includes the indication of n-fold traffic magnification, where, n is a positive integer, the edge node receives the first request information after receiving the copy instruction, and copies the first request information n times to acquire n pieces of second request information, so as to magnify the traffic.

When the copy instruction includes the indication of m-fold traffic minification, where, m is a positive integer, the edge node receives the first request information after receiving the copy instruction, and copies once every m pieces of the first request information to acquire one piece of second request information, so as to minify the traffic. For example, when m is 3, a first piece of first request information, a fourth piece of first request information, a seventh piece of first request information, . . . received are sequentially copied.

After copying the first request information to generate the second request information, the edge node marks the first request information copied and the second request information generated by copying, that is to say, marks the second request information and the first request information corresponding to the second request information, to acquire the first request information and the second request information respectively including a copy identifier.

The edge node responds to the first request information including a copy identifier, to acquire first response information including a copy identifier.

Step 203: the edge node sends the second request information to a CDN system to be detected.

The CDN system to be detected receives the second request information sent by the edge node, and responds to the second request information, to acquire second response information. When the second request information includes a copy identifier, the acquired second response information also includes a copy identifier.

Step 204: the detecting node acquires the first response information corresponding to the first request information, and acquires the second response information corresponding to the second request information from the CDN system to be detected.

In specific application, after responding to the request information, the edge node uploads the response information to a log storage system. The response information includes a response result and response time. Each piece of response information includes a status code to indicate whether the response is successful, so the response result may include the status code. The response time is time for responding to the request information.

The log storage system includes response information of all the request information. The first response information and the second response information both include a copy identifier; and by looking up the response information including a copy identifier, the first response information may be looked up from a log storage system of the present CDN system, and the second response information may be looked up from a log storage system of the CDN system to be detected. Specifically, the second response information may be looked up from the log storage system of the CDN system to be detected through an interface.

Step 205: the detecting node compares the first response information with the second response information, to acquire service quality of the CDN system to be detected.

The second request information is copied from the first request information, and contents accessed by the two pieces of request information are the same, the present CDN system responds to a same request as the CDN system to be detected; and service quality of the present CDN system meets requirements by default, so the first response information acquired thereby also meets the requirements, and may serve as a reference value to judge quality of the second response information acquired by the CDN system to be detected. Further, the detecting node may judge the service quality of the CDN system to be detected by comparing the response results and the response time in the response information of the present CDN system and the CDN system to be detected.

During implementation, the detecting node may judge the service quality of the CDN system to be detected by comparing the response information generated by the present CDN system and the CDN system to be detected with respect to a same traffic. A plurality of pieces of first request information received by the edge node and second request information copied from these pieces of first request information are considered as a same traffic. The present CDN system and the CDN system to be detected respectively generate a piece of response information with respect to a same traffic; the piece of response information generated by the present CDN system includes a plurality of pieces of first response information, and the piece of response information generated by the CDN system to be detected includes a plurality of pieces of second response information. Firstly, response results in the two pieces of response information are compared, and a specific process includes: judging whether a response result in each piece of first response information of the plurality of pieces of first response information is the same as a response result in second response information corresponding thereto; if it is the same, it indicates that the comparison succeeds; if it is not the same, it indicates that the comparison fails. If a ratio of results of successful comparisons to all the results of comparisons reaches a first preset ratio, it indicates that function implementation of the CDN system to be detected meets preset requirements. Response time in the two pieces of response information is compared, to judge the quality of the CDN system to be detected, and a specific process includes: calculating a difference between response time in each piece of first response information of the plurality of pieces of first response information and response time in second response information corresponding thereto; if a ratio of differences larger than a preset value to all differences reaches a second preset ratio, it indicates that the service quality of the CDN system to be detected meets the preset requirements.

Advantageous effects of the embodiment of the present application are as follows:

Firstly, the edge node copies request information sent by a client to acquire testing traffic for testing the other CDN system; since the edge node receives a large amount of request information in a real scene, a large amount of diverse testing traffic will be acquired by copying traffic, which can also improve construction efficiency of the testing traffic, and can improve precision of the test with real request information;

Secondly, the entire testing process of the embodiment of the present application, including comparative analysis of the response results, is implemented by automation, which, thus, reduces related management costs and labor costs, and improves efficiency and precision of the test;

Thirdly, in the detecting method according to the embodiment of the present application, the service quality of the other CDN system to which the request is to be switched can be detected in advance, so as to ensure the service quality after switch, and reduce a back-switch condition caused by a problem of service quality after switch.

Based on a same concept as the above-described embodiment of the method for detecting the service quality of the CDN system, an embodiment of the present application further provides a system for detecting service quality of a CDN system, the system including: a detecting node and an edge node.

Figure 3:
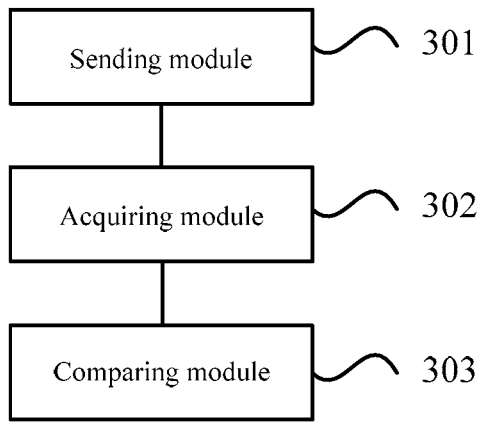
FIG. 3 is a structural block diagram of a detecting node provided by an embodiment of the present application.

Refer to a structural block diagram of the detecting node shown in FIG. 3, the detecting node includes:

a sending module 301, configured to send a copy instruction to the edge node, to cause the edge node to copy received first request information to generate second request information after receiving the copy instruction, and to cause the edge node to send the second request information to a CDN system to be detected;

an acquiring module 302, configured to acquire first response information corresponding to the first request information, and acquire second response information corresponding to the second request information from the CDN system to be detected;

a comparing module 303, configured to compare the first response information with the second response information to acquire service quality of the CDN system to be detected.

For example, the copy instruction includes a target domain name.

Accordingly, the edge node is specifically configured to:

receive the first request information after receiving the copy instruction, and if the first request information includes the target domain name, copy the first request information to generate the second request information.

For example, the copy instruction includes an indication of n-fold traffic magnification, where, n is a positive integer;

Accordingly, the edge node is further configured to:

receive the first request information after receiving the copy instruction, and copy the first request information n times to acquire n pieces of second request information.

For example, the copy instruction includes an indication of m-fold traffic minification, where, m is a positive integer;

Accordingly, the edge node is further configured to:

receive the first request information after receiving the copy instruction, and copy once every m pieces of the first request information to acquire one piece of second request information.

For example, the edge node is further configured to mark the second request information and the first request information corresponding to the second request information.

For example, the first response information and the second response information both include a copy identifier.

For example, the comparing module 303 is specifically configured to:

acquire the service quality of the CDN system to be detected by comparing response results and response time in the first response information and the second response information.

Advantageous effects of the embodiment of the present application are as follows:

Firstly, the edge node copies request information sent by a client to acquire testing traffic for testing the other CDN system; since the edge node receives a large amount of request information in a real scene, a large amount of diverse testing traffic will be acquired by copying traffic, which can also improve construction efficiency of the testing traffic, and can improve precision of the test with real request information;

Secondly, the entire testing process of the embodiment of the present application, including comparative analysis of the response results, is implemented by automation, which, thus, reduces related management costs and labor costs, and improves efficiency and precision of the test;

Thirdly, in the detecting method according to the embodiment of the present application, the service quality of the other CDN system to which the request is to be switched can be detected in advance, so as to ensure the service quality after switch, and reduce a back-switch condition caused by a problem of service quality after switch.

It should be noted that, the detecting node provided by the above-described embodiment may be implemented based on a computer program; when executing detection of CDN system service quality, it is illustrated only according to division of the above-described respective functional modules; and in actual application, the above-described function may be allocated to different functional modules according to requirements, that is, an internal structure of the detecting node is divided into different functional modules to complete all or part of the functions as described above. In addition, the system for detecting the service quality of the CDN system and the method for detecting the service quality of the CDN system provided by the above-described embodiments belong to a same concept, the method embodiment may be referred to for details of specific implementation process thereof, and no details will be repeated here.

Figure 4:
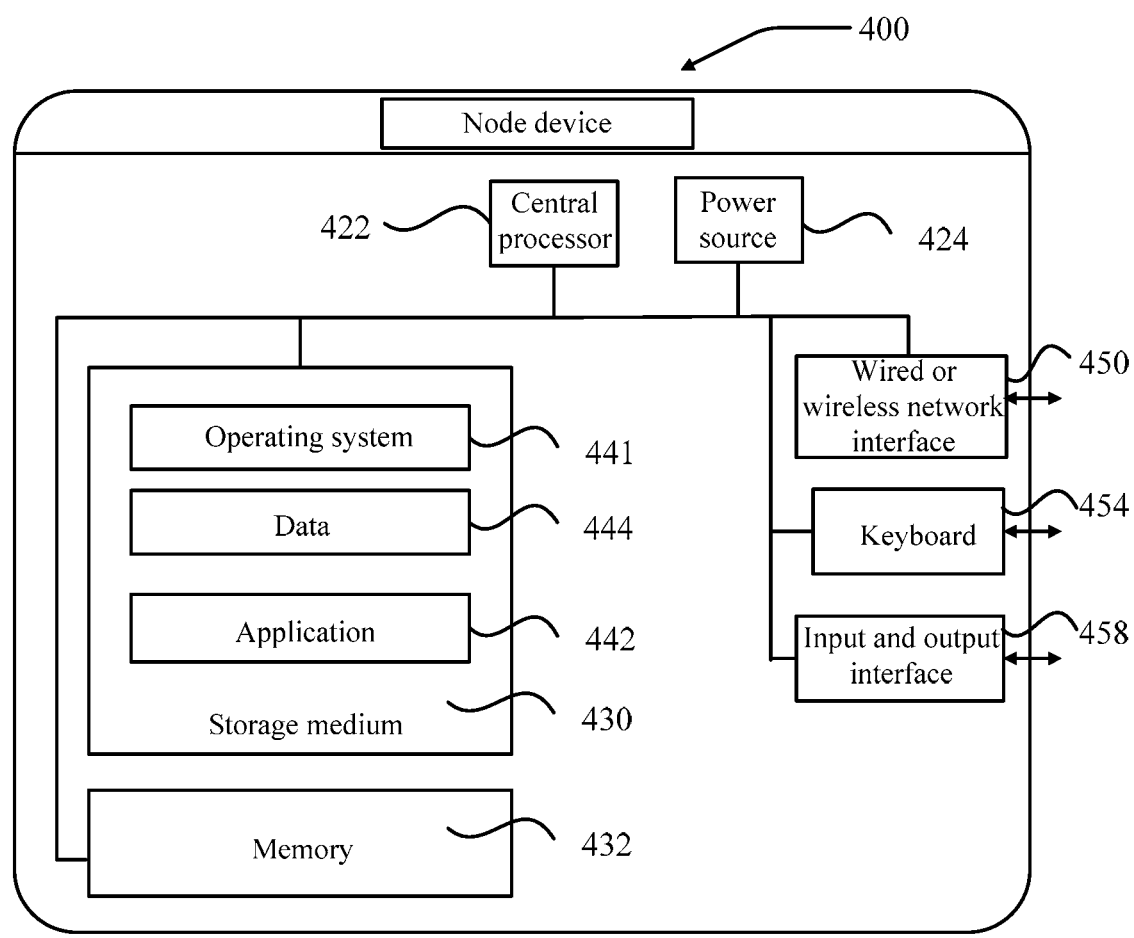
FIG. 4 is a structural block diagram of a node device provided by an embodiment of the present application.

FIG. 4 is a structural block diagram of a node device provided by an embodiment of the present application. A node device 400 may vary greatly depending on configuration or performance, and may include one or more central processors 422 (e.g., one or more processors) and a memory 432, one or more storage applications 442 or a storage medium 430 for data 444 (e.g., one or more mass storage devices). The memory 432 and the storage medium 430 may be temporary storage or persistent storage. A program stored on the storage medium 430 may include one or more modules (not shown), and each module may include a series of instruction operations in the node device. Still further, the central processor 422 may be configured to communicate with storage medium 430, to execute a series of instruction operations in the storage medium 430 on the node device.

The node device 400 may further include one or more power sources 424, one or more wired or wireless network interfaces 450, one or more input and output interfaces 458, one or more keyboards 454, and/or, one or more operating systems 441, such as Windows Server™, Mac OS X™, Unix™, Linux™ and FreeBSD™.

The node device 400 may include a memory, and one or more computer programs, wherein, the one or more computer programs are stored in the memory, and as configured, the one or more computer programs are executable by the one or more processors to implement the above-described method for detecting the service quality of the CDN system:

sending a copy instruction to an edge node, to cause the edge node to copy received first request information to generate second request information after receiving the copy instruction, and sending, by the edge node, the second request information to a CDN system to be detected;

comparing first response information of the first request information with second response information of the second request information to acquire service quality of the CDN system to be detected.

Those skilled in the art may understand that implementation of all or part of the steps of the above-described embodiments may be completed by hardware, or may also be completed by related hardware as instructed by a program; the program may be stored in a computer readable storage medium; and the above-mentioned storage medium may be a read only memory, a magnetic disk or an optical disk, and the like.

The foregoing embodiments merely are preferred embodiments of the present application, and not intended to limit the present application. Any modification, equivalent substitution, improvement, and the like, made within the spirit and principles of the present disclosure should be covered within the protection scope of the present application.

What is claimed is:

1. A method for detecting service quality of a CDN system, wherein, the method comprises:

sending, by a detecting node, a copy instruction to an edge node to enable the edge node to copy first request information to generate second request information after receiving the copy instruction, and to send the second request information to the CDN system, wherein the first request information is sent from a client to the edge node;

comparing, by the detecting node, first response information of the first request information with second response information of the second request information to acquire service quality of the CDN system, wherein the first response information includes a response result and response time of the edge node responding to the first request information, and the second response information includes a response result and response time of the CDN system responding to the second request information.

2. The method according to claim 1, wherein, the copy instruction comprises a target domain name;

the step of copying, by the edge node, received first request information to generate second request information after receiving the copy instruction, comprises:

receiving, by the edge node, the first request information after receiving the copy instruction, and if the first request information comprises the target domain name, copying the first request information to generate the second request information.

3. The method according to claim 1, wherein, the copy instruction comprises an indication of n-fold traffic magnification, where, n is a positive integer;

the step of copying, by the edge node, received first request information to generate second request information after receiving the copy instruction, comprises:

receiving, by the edge node, the first request information after receiving the copy instruction, and copying the first request information n times to acquire n pieces of second request information.

4. The method according to claim 1, wherein, the copy instruction comprises an indication of m-fold traffic minification, where, m is a positive integer;

the step of copying, by the edge node, received first request information to generate second request information after receiving the copy instruction, comprises:

receiving, by the edge node, the first request information after receiving the copy instruction, and copying once every m pieces of the first request information to acquire one piece of second request information.

5. The method according to claim 1, wherein, after the step of copying, by the edge node, received first request information to generate second request information after receiving the copy instruction, the method comprises:

marking, by the edge node, the second request information and the first request information corresponding to the second request information.

6. The method according to claim 1, wherein, the first response information and the second response information comprise a copy identifier.

7. The method according to claim 1, wherein, the step of comparing, by the detecting node, first response information of the first request information with second response information of the second request information to acquire service quality of the CDN system, comprises:

acquiring the service quality of the CDN system by comparing the response result and response time in the first response information with the response result and response time in the second response information.

8. The method according to claim 1, wherein, the edge node copies the received first request information by using a preset request copying tool, after receiving the copy instruction.

9. The method according to claim 1, wherein, if a traffic of the received first request information by the edge node is insufficient to detect the service quality of the other CDN system, the traffic is magnified according to detection requirement; or
if a traffic of the received first request information by the edge node is sufficient to detect the service quality of the other CDN system, the traffic is minified according to detection requirement.

10. The method according to claim 1, wherein, the step of comparing, by the detecting node, first response information of the first request information with second response information of the second request information to acquire service quality of the CDN system, comprises:
judging whether a response result in each piece of first response information of the plurality of pieces of first response information is the same as a response result in second response information corresponding to the first response information;
if yes, indicating that the comparison succeeds;
if not, indicating that the comparison fails;
if a ratio of results of successful comparisons to all the results of comparisons reaches a first preset ratio, indicating that function implementation of the CDN system meets a preset requirement.

11. The method according to claim 6, further comprising:
looking up the first response information from a log storage system of a CDN system where the detecting node and the edge node locates, by looking up the first response information comprising the copy identifier; and
looking up the second response information from a log storage system of the CDN system the service quality of which is to be detected through an interface, by looking up the second response information comprising the copy identifier.

12. The method according to claim 7, wherein, the response result comprises a status code to indicate whether the response is successful, the response time is time for responding to the request information.

13. The method according to claim 7, wherein, the step of acquiring the service quality of the CDN system by comparing the response result and response time in the first response information with the response result and response time in the second response information, comprises:
calculating a difference between response time in each piece of first response information of the plurality of pieces of first response information and response time in second response information corresponding to the first response information;
if a ratio of differences larger than a preset value to all differences reaches a second preset ratio, indicating that the service quality of the CDN system meets a preset requirement.

14. A node device, comprising:
at least one processor; and
a memory communicating connected with the at least one processor; wherein,
the memory is stored with instructions executable by the at least one processor, the instructions are executable by the at least one processor, to cause the at least one processor to execute a method for detecting the service quality of the CDN system, wherein the method comprises:
sending, by a detecting node, a copy instruction to an edge node to enable the edge node to copy first request information to generate second request information after receiving the copy instruction, and to send the second request information to the CDN system, wherein the first request information is sent from a client to the edge node;
comparing, by the detecting node, first response information of the first request information with second response information of the second request information to acquire service quality of the CDN system, wherein the first response information includes a response result and response time of the edge node responding to the first request information, and the second response information includes a response result and response time of the CDN system responding to the second request information.

15. The node device according to claim 14, wherein, the copy instruction comprises a target domain name;
the step of copying, by the edge node, received first request information to generate second request information after receiving the copy instruction, comprises:
receiving, by the edge node, the first request information after receiving the copy instruction, and if the first request information comprises the target domain name, copying the first request information to generate the second request information.

16. The node device according to claim 14, wherein, the copy instruction comprises an indication of n-fold traffic magnification, where, n is a positive integer;
the step of copying, by the edge node, received first request information to generate second request information after receiving the copy instruction, comprises:
receiving, by the edge node, the first request information after receiving the copy instruction, and copying the first request information n times to acquire n pieces of second request information.

17. The node device according to claim 14, wherein, the copy instruction comprises an indication of m-fold traffic minification, where, m is a positive integer;
the step of copying, by the edge node, received first request information to generate second request information after receiving the copy instruction, comprises:
receiving, by the edge node, the first request information after receiving the copy instruction, and copying once every m pieces of the first request information to acquire one piece of second request information.

18. The node device according to claim 14, wherein, after the step of copying, by the edge node, received first request information to generate second request information after receiving the copy instruction, the method comprises:
marking, by the edge node, the second request information and the first request information corresponding to the second request information.

19. The node device according to claim 14, wherein, the first response information and the second response information comprise a copy identifier.

20. A non-transitory computer readable storage medium, stored with a computer program, wherein, the computer program, when executed by the processor, executes a method for detecting the service quality of the CDN system, wherein the method comprises:
sending, by a detecting node, a copy instruction to an edge node to enable the edge node to copy first request information to generate second request information after receiving the copy instruction, and to send the second request information to the CDN system, wherein the first request information is sent from a client to the edge node;

comparing, by the detecting node, first response information of the first request information with second response information of the second request information to acquire service quality of the CDN system, wherein the first response information includes a response result and response time of the edge node responding to the first request information, and the second response information includes a response result and response time of the CDN system responding to the second request information.

* * * * *